United States Patent
Hafellner et al.

(10) Patent No.: US 11,125,651 B2
(45) Date of Patent: Sep. 21, 2021

(54) MOVABLE PLATFORM WITH A DEFORMABLE MAIN BODY FOR THE TESTING OF COLLISIONS OR NEAR-COLLISION SITUATIONS

(71) Applicant: 4ACTIVESYSTEMS GMBH, Traboch (AT)

(72) Inventors: Reinhard Hafellner, Spielberg (AT); Martin Fritz, Kobenz (AT)

(73) Assignee: 4activeSystems GmbH, Traboch (AT)

( * ) Notice: Subject to any disclaimer, the term of this patent is extended or adjusted under 35 U.S.C. 154(b) by 122 days.

(21) Appl. No.: 16/315,551

(22) PCT Filed: Jul. 5, 2017

(86) PCT No.: PCT/EP2017/066793
§ 371 (c)(1),
(2) Date: Mar. 31, 2019

(87) PCT Pub. No.: WO2018/007455
PCT Pub. Date: Jan. 11, 2018

(65) Prior Publication Data
US 2019/0219486 A1    Jul. 18, 2019

(30) Foreign Application Priority Data
Jul. 6, 2016    (DE) .................. 10 2016 112 422.2

(51) Int. Cl.
   *G01M 17/007*    (2006.01)
   *G01M 7/08*      (2006.01)
(52) U.S. Cl.
   CPC .......... *G01M 17/0078* (2013.01); *G01M 7/08* (2013.01)
(58) Field of Classification Search
   CPC ..... G01M 7/08; G01M 17/00; G01M 17/0078
   (Continued)

(56) References Cited

U.S. PATENT DOCUMENTS

| 3,098,319 A | 7/1963 | Ellis |
| 3,425,154 A | 2/1969 | Lindsey et al. |

(Continued)

FOREIGN PATENT DOCUMENTS

| AT | WO2012156484 | 11/2012 |
| CN | 101978250 | 2/2011 |

(Continued)

OTHER PUBLICATIONS

"Polyurethane (PUR) Typical Properties Generic PUR"—https://plastics.ulprospector.com/generics/45/c/t/polyurethane-pur-properties-processing (Year: NA).*

(Continued)

*Primary Examiner* — Benjamin R Schmitt
(74) *Attorney, Agent, or Firm* — Indiano Law Group LLC; E. Victor Indiano; John T. Woods, III

(57) ABSTRACT

The present invention relates to a platform for testing collisions or near-collision situations between a collision body, in particular a vehicle, and a test object. The platform has a base body, which has a bottom surface and an attachment surface formed opposite to the bottom surface, wherein an attachment device is formed on the attachment surface for attaching the test object. Furthermore, the platform has at least one roller element, which is arranged at the bottom surface, wherein the roller element is configured such that the base body is displaceable along a ground by the roller element. The base body is formed of an elastically deformable material having a thickness of less than 2500 kg/m³.

20 Claims, 3 Drawing Sheets

Figure 3:
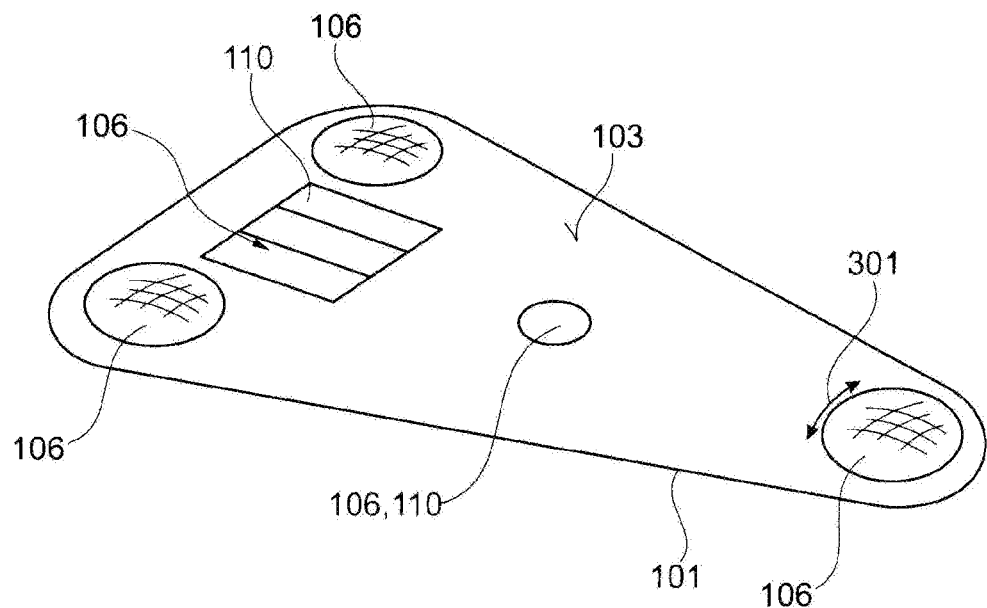

(58) Field of Classification Search
USPC .............. 73/12.01, 12.04, 118.01, 865.3
See application file for complete search history.

(56) References Cited

U.S. PATENT DOCUMENTS

| | | | |
|---|---|---|---|
| 3,557,471 | A | 1/1971 | Payne et al. |
| 3,583,098 | A | 6/1971 | Bear |
| 5,224,896 | A | 7/1993 | Terzian |
| 5,487,441 | A | 1/1996 | Endo et al. |
| 6,120,343 | A | 9/2000 | Migliorati et al. |
| 9,355,576 | B2 | 5/2016 | Fritz |
| 9,870,722 | B2 | 1/2018 | Fritz et al. |
| 2005/0021180 | A1 | 1/2005 | Kwon et al. |
| 2005/0066705 | A1 | 3/2005 | Choi |
| 2005/0155441 | A1 | 7/2005 | Nagata |
| 2006/0075826 | A1 | 4/2006 | Roberts et al. |
| 2010/0078987 | A1 | 4/2010 | Lubecki |
| 2013/0018526 | A1* | 1/2013 | Kelly ............ G01M 17/0078 701/2 |
| 2014/0102224 | A1 | 4/2014 | Fritz |
| 2015/0317917 | A1 | 11/2015 | Fritz et al. |
| 2016/0054199 | A1 | 2/2016 | Fritz et al. |

FOREIGN PATENT DOCUMENTS

| | | |
|---|---|---|
| DE | 3901079 | 7/1990 |
| DE | 91 03 575 U1 | 11/1991 |
| DE | 3901079 | 3/1993 |
| DE | 19802590 | 8/1999 |
| DE | 10 2007 024565 | 2/2008 |
| DE | 102008051233 | 5/2009 |
| DE | 102007035474 | 6/2009 |
| DE | 102008022546 | 11/2009 |
| DE | 102008025539 | 12/2009 |
| DE | 102008030208 | 12/2009 |
| DE | 102011012542 | 2/2011 |
| DE | 102011017146 | 10/2012 |
| DE | 102013214936 | 7/2013 |
| EP | 0034862 | 9/1981 |
| EP | 1010919 | 12/1999 |
| EP | 1734352 | 12/2006 |
| EP | 2192567 | 11/2008 |
| EP | 2 657 672 A1 | 10/2013 |
| FR | 2680902 | 5/1993 |
| GB | 2469932 | 11/2010 |
| GB | 2 496 442 A | 5/2013 |
| IT | WO160474 | 8/2001 |
| JP | 56120571 | 2/1980 |
| JP | 11321264 | 5/1998 |
| JP | 2005349966 | 12/2005 |
| JP | 2000-167259 | 6/2006 |
| JP | 2000-039686 | 2/2008 |
| JP | 2014043151 | 3/2014 |
| JP | 2016519295 | 6/2016 |
| WO | WO 01/60474 | 8/2001 |
| WO | WO 2006/078890 | 7/2006 |
| WO | WO 2009144199 | 5/2009 |
| WO | WO2009103518 | 8/2009 |
| WO | WO 2012/156484 | 11/2012 |
| WO | 2013/070155 | 5/2013 |

OTHER PUBLICATIONS

International Search Report for PCT/EP2012/059203.
English Translation of Office Action of Japan Patent Office; dated Nov. 1, 2016.
Advanced crash avoidance Technologies Program—Final report of the Honda—DRI Team (Dot HS 811 454 A) Jun. 2011.
International Search Report for PCT/EP2013/058,994 (12 pages).
Cited References WO 2012/156484—Translation of DE 102008025539; DE 102007035474.
International Search Report for PCT/EP2017/066793.
English translation of Abstract of foreign language references from International Search Report.
European Patent Office; Coil spring fitting structure in suspension; Japan Patent No. JPH11321264; machine translation.
European Patent Office; Caster; Japan Patent Application No. JP2014043151; machine translation.
European Patent Office; Tire wear sensor and industrial vehicle equipped therewith; Japan Patent Application No. JP2005349966; machine translation.
Japan Patent Office; Notice of Reasons for Refusal; Japan Patent Application 2019-500578; dated Feb. 25, 2021.
Japan Patent Office; Notice of Reasons for Refusal; Japan Patent Application 2019-500578; dated Feb. 25, 2021 English Machine Translation.
English Machine Translation of JP2016-519295A.

* cited by examiner

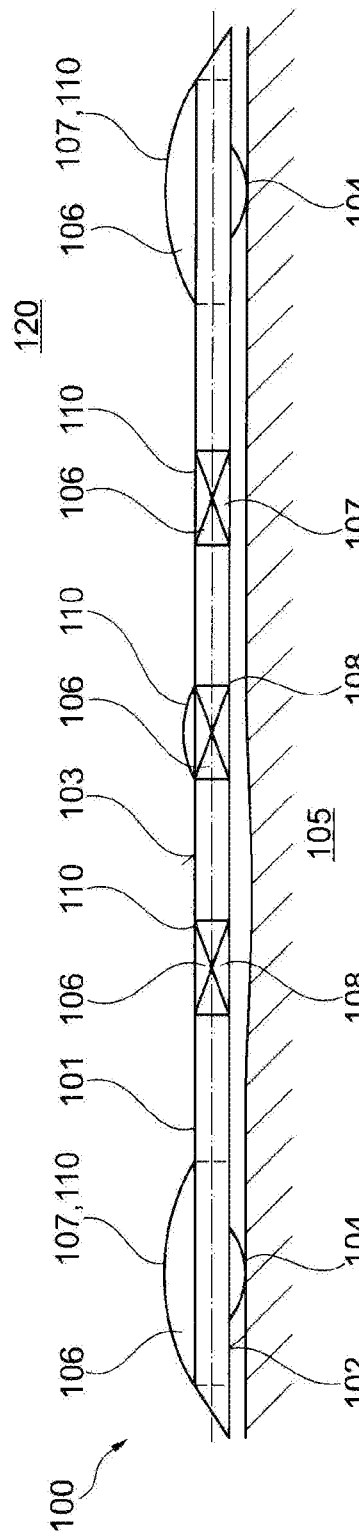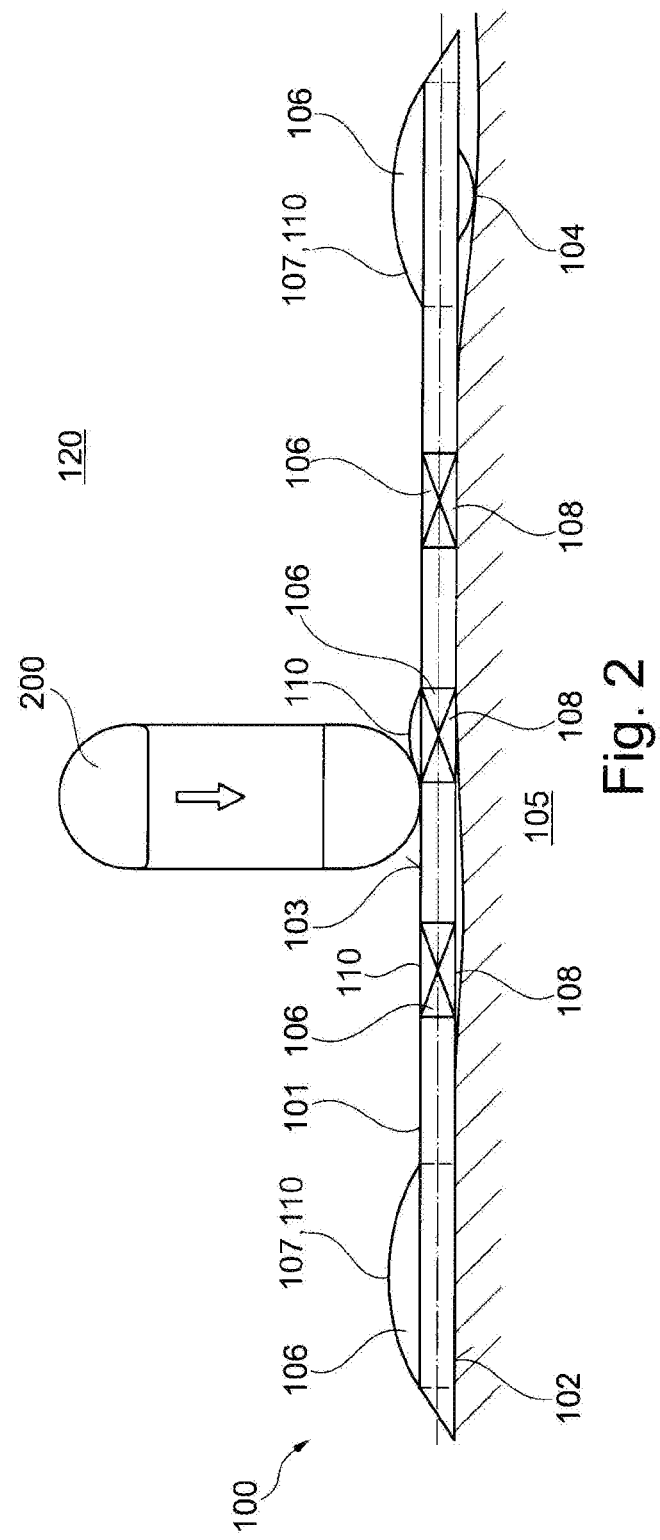

MOVABLE PLATFORM WITH A DEFORMABLE MAIN BODY FOR THE TESTING OF COLLISIONS OR NEAR-COLLISION SITUATIONS

CROSS-REFERENCE TO RELATED APPLICATIONS

The present application is a national phase application derived from the international patent application no. PCT/EP2017/066793 filed Jul. 5, 2017, which in turn benefits from the filing date of the German patent application no. DE 10 2016 112 422.2, filed Jul. 6, 2016, both of which are incorporated herein by reference in their entirety.

TECHNICAL AREA

The present invention relates to platforms for testing collisions or near-collision situations between a collision body, in particular a vehicle, and a test object, as well as a method for manufacturing platforms.

BACKGROUND OF THE INVENTION

In modern automotive technology, more and more assistance systems come into operation, which actively monitor the surroundings of the vehicle and passively or actively intervene in the steerage of the vehicle. Assistance systems thus have to be subjected to tests to the full extent in order to prevent misjudgements of the assistance systems.

For testing modern assistance systems, collisions or near-collision situations between the vehicle to be tested and a test object are effectuated. For a collision between a vehicle and a test object, for example the vehicle or the test object is arranged stationary at a defined position, and the collision partner is accelerated to a defined velocity. In order to effectuate a collision situation close to reality, such as for example a collision of two vehicles or of one vehicle with a person in road traffic, both the vehicle and the test object are set in motion in order to generate a collision or a near-collision situation. Herein, in particular driver assistance systems can be tested close to reality.

In order to test an assistance system for all imaginable situations, it is necessary that both the vehicle and the test object move towards each other, from test to test, from the most different directions. In order to effectively test according situations, it is necessary that a test system can be adapted quickly and without complex reconstructions to different test situations. For this purpose, it is known, for example, to place test objects, such as, for example, a dummy, on a displaceable support and to pull the support, for example with cable pull systems, in a direction, which crosses a driving lane of a test vehicle.

Herein, it is necessary that the components and devices of the test system are formed inconspicuously such that the test system does not influence the assistance system during the test, because otherwise no experiments close to reality are performable.

SUMMARY OF THE INVENTION

There may a need to establish a compact, robust and temperature-independent displaceable platform for a test system.

This object is solved by a platform for testing collisions or near-collision situations between a collision body and a test object as well as with a method for manufacturing a platform for testing collisions or near-collision situations between a collision body and a test object, according to the independent patent claims.

According to an exemplary embodiment example of the present invention and a first aspect of the invention, there is described a platform for testing collisions or near-collision situations between a collision body, in particular a vehicle, and a test object. The platform has a base body, which has a bottom surface and an attachment surface formed opposite to the bottom surface, wherein an attachment device is formed on the attachment surface for attaching the test object. Furthermore, the platform has at least one roller element, which is arranged at the bottom surface, wherein the roller element is configured such that the base body is displaceable along a ground by the roller element. The base body is formed of an elastically deformable material having a density of less than 2500 kg/m$^3$.

According to an exemplary embodiment example of the present invention and a second aspect of the present invention, there is described a platform for testing collisions or near-collision situations between a collision body, in particular a vehicle, and a test object. The platform has a base body, which has a bottom surface and an attachment surface formed opposite to the bottom surface, wherein an attachment device is formed on the attachment surface for attaching the test object. Furthermore, the platform has at least one roller element, which is arranged at the bottom surface, wherein the roller element is configured such that the base body is displaceable along a ground by the roller element. The platform has a carrier structure having at least one elastically deformable carrier element, which is coupled to the base body such that, after a load-induced deformation of the base body, the carrier element forms the base body back in a load-free starting shape.

According to an exemplary embodiment example of the present invention and a third aspect of the present invention, there is described a test system for testing collisions or near-collision situations between a collision body, in particular a vehicle, and a test object. The test system has a platform of the type described above and a test object, wherein the test object is attached on the attachment surface by the attachment device.

According to an exemplary embodiment example of the present invention and a fourth aspect of the present invention, there is described a method for manufacturing a platform for testing collisions or near-collision situations between a collision body, in particular a vehicle, and a test object. According to the method, there is provided a base body, which has a bottom surface and an attachment surface formed opposite to the bottom surface, wherein an attachment device is formed on the attachment surface for attaching the test object. Furthermore, according to the method, there is arranged at least one roller element at the bottom surface of the base body, wherein the roller element is configured such that the base body is displaceable along a ground by the roller element. The base body is formed of an elastically deformable material having a density of less than 2500 kg/m$^3$. Alternatively or in addition, there is provided a carrier structure having at least one elastically deformable carrier element, which is coupled to the base body such that, after a load-induced deformation of the base body, the carrier element forms the base body back in a load-free starting shape.

The collision body may represent, for example, a passively and statically present element, such as for example an impact wall or a standing object, such as for example a vehicle. Alternatively, the collision body may represent a self-moving object, such as for example a vehicle, such as for example a passenger car, a heavy load vehicle, a bus or a bicycle.

The test object, which may be attached on the platform, may be for example a human-like dummy, which is fixed standing, lying or sitting on the platform. Furthermore, the test object may represent a vehicle mock or a bicycle mock.

The test system may have the platform described above and the test object. The platform may be displaceable along a ground by the roller element described in more detail below. The platform, on which the test object may be arranged, may cross the driving path of the collision body, such that the approach of the test object to the collision body may be measured by driver assistance systems and the latter be tested thereby.

The platform may have the base body, which may form a sheet-like (board-like) shape. This may mean, that its extension within a ground plane may be significantly greater than its thickness in, for example, the vertical direction. Herein, the base body may have a bottom surface and an opposing attachment surface. The base body may be beared on a ground with its bottom surface. The at least one roller element may be arranged rotatably in the bottom surface, which roller element may protrude at least partially out of the base body and thus may provide a distance between the base body and the ground. An attachment device may be formed on the attachment surface. The attachment device may be configured to fix the test object. Furthermore, the attachment device may be configured controllably, in order to release the test object selectively, for example shortly prior to an impact situation, such that the attachment between the base body and the test object may be released.

The attachment device may consist, for example, of a hook system, into which the test object can be hooked up. Furthermore, the attachment device may have a magnet, in particular a controllable electromagnet, in order to fix the test object to the attachment surface by a magnetic holding force.

The at least one roller element may be arranged at the bottom surface. In a preferred embodiment, three or four roller elements may be arranged at the base body spaced at a distance to each other at the bottom surface. Thus, a high rolling stability and a good controllability (or steerability) of the platform may be given. The roller element may, for example, consist of rubber rollers, hard plastic material rollers, or plastic material rollers.

The platform may be displaceable along the ground by the at least one roller element. Herein, a pulling mechanism, such as for example a pull rope or a pull rod, may be attached at the base body in order to pull the platform over the ground. Furthermore, the base body may be attached on a guiding rail, wherein the base body may be displaceable along the guiding rail with the roller element. Furthermore, the platform may be configured freely displaceably, in that, as is described in more detail further below, the roller element itself may be driven and, according to an exemplary embodiment, configured steerable.

In order to provide a compact and at the same time however robust embodiment of the platform, it is proposed according to the present invention to form the base body of an elastically deformable material having a density of less than 2500 kg/m³ and/or to couple a carrier structure having at least one elastically deformable carrier element to the base body, such that, after a load-induced deformation of the base body, the carrier element may form the base body back in a load-free starting shape.

The term "elastically deformable" may describe the property of the material of the base body and/or of the carrier element, at which the base body and the carrier element form themselves back into their initial state after a deformation due to a particular force effect. The initial state may be that state, in which the base body and/or the carrier element may be present without a deformation force (for example any external load force).

Herein, the base body may be configured such that it may be spaced at a distance from the ground in a state, in which it may bear on the ground with the roller element and in which the test object may be attached on the attachment surface. This may mean, that the at least one roller element may bear on the ground. During a test, the collision body may drive over the base body, such that the latter may deform itself and may bear on the ground with its bottom surface, for example punctually or over the entire surface. After the collision body has driven over the base body, the latter may deform back again in the initial starting position.

Thus, the base body and thus the whole platform may be configured very flat and robust, because the base body may give in due to its elastic properties without breaking, as it would be the case in the case of stiff and rigid bodies. Due to the flat formation of the base body, the perception of assistance systems to be tested may be suppressed.

The elastically deformable material of the base body may have a density of about less than 2500 kg/m³ (kilogram per cubic meter), in particular less than 2000 kg/m³, less than 1800 kg/m³, less than 1200 kg/m³, and/or less than 800 kg/m³. In an exemplary embodiment, the elastically deformable material of the base body may have a density between about 500 kg/m³ and about 2500 kg/m³, between about 1000 kg/m³ and about 2000 kg/m³, or about 1800 kg/m³.

According to a further exemplary embodiment, the material may have an E-module of less than about 60 GPa (at 20° Celsius). In particular, the material of the base body may have an E-module of less than about 40 GPa, in particular less than about 20 GPa, less than about 15 GPa, less than about 10 GPa, or less than about 5 GPa (at 20° Celsius). The lower the E-module, the less stiff and more ductile may be the base body.

According to a further exemplary embodiment, the base body may have a thickness between the bottom surface and the attachment surface of less than 6 cm, in particular less than about 5 cm, or Tess than about 4 cm.

Herein, the thickness may be the shortest distance between the bottom surface and the attachment surface. Beside the region having the lowest thickness, the base body may further have scattered thicker regions, such as for example the installation boxes described below. Due to the selection according to the invention of the density of the material of the base body, an extremely thin formation, in particular less than 6 cm thickness, may be possible.

According to a further exemplary embodiment, the base body may have a pressure resistance of at least 0.5 MPa, in particular at least 1 MPa. Thus, the base body may have a sufficient stability (or rigidity) so that a vehicle and/or a heavy load vehicle as a collision body may drive over the base body without damaging it plastically and/or irreversibly. At the same time, a sufficient elastic deformability may be provided.

According to a further exemplary embodiment, the material of the base body of the platform may be an organic material, i.e. a material, which may consist of carbon, oxygen, hydrogen and nitrogen bonds. The organic material may be e.g. a plastic material, in particular a fiber reinforced material. Herein, the fiber reinforced material may have, for example, carbon fibers or glass fibers, which may be formed in synthetic resin or another matrix material having elastic properties. For example, the plastic material and/or the fiber material may consist of an elastomer, e.g., a thermoplastic material. Furthermore, the material of the base body may be rubber and/or a hard rubber material. Furthermore, the organic material may be a wood material.

According to a further exemplary embodiment, the base body may be manufactured from a solid material or from a sandwich structure. The solid material may have pores, such as for example in a (rigid) foam material, or cavities, such as for example in a rib structure. In a sandwich material, force-receiving stiff and/or rigid top layers may be utilized, which may be are held spaced at a distance by a light core material. The core may also have a honeycomb inner structure. For example, interspaces may be present in the interior. For example, the installation boxes explained below may be formed in the solid material or the sandwich structure of the base body.

According to a further exemplary embodiment, the platform may have three roller elements, which may be arranged at the bottom surface spaced at a distance, wherein the roller elements may be configured such that the base body may be displaceable along a ground by the roller elements.

According to a further exemplary embodiment, the base body may form a triangular, a quadrangular, a round or an oval plan view (or footprint). A triangular plan view may have three corner regions. For example, one roller element may be formed in each one of the corner regions. Correspondingly, a quadrangular plan view may have four corner regions, wherein one roller element may be formed in each one of the corner regions.

According to a further exemplary embodiment, the platform may have a drive unit, which may be configured to drive the at least one roller element. The drive unit may represent an electric motor. For example, one drive unit may be assigned to each roller element. This drive unit may drive, for example, directly an axis of the roller element. Furthermore, a central drive unit may be installed in the base body, wherein the central drive unit may drive, for example, plural roller elements.

According to a further exemplary embodiment, the drive unit may be arranged spaced at a distance to, the at least one roller element, wherein the drive unit may be coupled to the roller element for transmitting a driving force, in particular by a drive belt, by a gear transmission, in particular a spur-gear system, and/or as a direct drive. The coupling may also be provided by a driving chain or by a gear train.

According to a further exemplary embodiment, the platform further may have a steering mechanism, which may be configured to steer the at least one roller, element. The roller element may, for example, be formed rotatably at the base body. According to a further exemplary embodiment, the steering mechanism may have a steering motor (e.g. servomotor, linear motor), which may be coupled to the at least one roller element in order to steer the roller element. For example, the steering mechanism may have a steering axle, to which the roller element may be attached rotatably. A servomotor of the steering mechanism, which may be arranged at the roller element or centrally in the base body, may steer the roller element around the steering axle after receipt of according control commands.

According to a further exemplary embodiment, the platform may have an installation box having an installation volume, which installation box may be arranged in a receiving opening of the base body. The installation box may have an installation opening, through which the installation volume may be accessible from the outside. The installation box may be formed integrally, for example as a recess in the base body. Furthermore, the installation box may form a self-supporting unit and may be arranged in the base body and/or in a receiving opening conceived for this accordingly. One or more functional elements of the platform may be incorporated in the installation volume of the installation box. Thus, for example, the roller elements, sensors, drive units, or control units may be installed in the installation box.

Furthermore, plural installation boxes may be arranged and be formed in the base body in order to install functional elements there. The installation boxes that may be spaced at a distance may be functionally coupled to each other, for example for a data exchange (for example via conducting wires or a fiber optic cable).

According to an exemplary embodiment, the installation box may be conceived in the receiving opening of the base body such that a temperature control region of the installation box may be in contact with surroundings of the base body. The temperature control region may formed of a material, which may have a greater heat conductivity coefficient than a material of the base body.

The temperature control region of the installation box may be a region of the latter, which may be in contact with surroundings of the base body, i.e. for example with the ambient air of the base body. Thus, the ambient air of the base body may be utilized as a coolant, and the temperature control region may emit heat from the interior of the installation box to the surroundings. Thus, in particular, the temperature of the functional units in the installation volume may be dispensed (or emitted) to the outside to the surroundings via the temperature control region.

The temperature control region may in particular be formed of a material, which may have a greater heat conductivity coefficient than a material of the base body. The heat conductivity coefficient may describe the heat conductivity of a material. The heat conductivity $\lambda$ [W/(m*K)] (Waft per meter and Kelvin) of a material may define the heat flow through a material due to its heat conductivity. For example, the heat conductivity $\lambda$ of the material of the temperature control region may be greater than about 20 W/(m*K), in particular greater than 100 W/(m*K), greater than 200 W/(m*K), greater than 250 W/(m*K), or greater than 300 W/(m*K). The material of the temperature control region may be, for example, a metallic material. For example, in this respect, the material of the temperature control region may be titanium, aluminium, gold, steel, or copper.

Herein, the installation box may be formed completely from the same material as that of the temperature control region. Alternatively, in an exemplary embodiment, the installation box may consist of a further base body, which may have a first material and the temperature control region may have a material, which may have a second material, wherein the first material and the second material may differ from each other. Furthermore, in particular, the second material may have a greater heat conductivity coefficient than the material of the base body of the platform. In this respect, the second material of the temperature control region may have a greater heat conductivity coefficient than the first material of the further base body of the installation box. Thus, for example, the further base body of the installation box may consist of a plastic material, while the temperature control region of the installation box may be formed from a metallic raw material.

The material of the base body of the platform may have, for example, a heat conductivity coefficient, which may be less than about 250 W/(m*K), in particular less than 50 W/(m*K), less than 1 W/(m*K) or less than 0.1 W/(m*K).

By the platform according to the invention, the base body of the platform may be configured very flatly between the installation boxes. In the region of the installation box, the base body may have a widening (or thickening). All functional elements, which may be necessary for the operation of the platform and for performing the tests, may installable in the installation box. Due to the material selection according to the invention of the temperature control region of the installation box, the generated heat of the functional units in the installation volume may be dissipated selectively and effectively. Herein, it may not be necessary to select the material of the base body as a function of its heat conductivity properties, since the function of the heat dissipation may be fulfilled exclusively by the temperature control region of the installation box. Thus, an advantageous material combination between the installation box and the base body of the platform may be chosen without risking an overheating of the functional elements. By the platform according to the invention, thus, a temperature-resistant displaceable platform may be provided, which may at the same time be formed robustly and efficiently.

According to an exemplary embodiment, the installation box may have cooling fins, which extend along a surface of the temperature control region. The cooling fins may extend from the surface in particular in the direction towards the surroundings. The cooling fins may serve for increasing the surface of the temperature control body in order to improve the heat transfer to the surroundings and hence the cooling. The cooling fins may form a corrugated surface of the temperature control region. In an exemplary embodiment, the lid described above may have the cooling fins.

According to a further exemplary embodiment, the installation box may have a coolant duct (or coolant channel), wherein the coolant duct may run in the installation volume and further along or in the temperature control region such that a thermal coupling between a coolant in the coolant duct and the temperature control region may be providable. The coolant, such as for example a liquid, for example water, may flow in the coolant duct. The coolant duct may run for example along an inner side of the installation box, such that heat from the installation volume may be absorbed by the coolant. The coolant duct further may run along the temperature control region in order to emit the heat of the coolant to the temperature control region and accordingly further to the surroundings. Herein, the cooling duct may be in direct contact with a surface, in particular the inner surface, of the temperature control region, in order to provide a thermal coupling. Furthermore, a heat conducting paste may be inserted between the coolant duct and the temperature control region. In an exemplary embodiment, a portion of the coolant duct may run through the detachable lid. The region of the coolant duct in the lid may be coupled fluid-tightly with regions of the coolant duct within the installation box by fluid couplings. The coolant duct may run in a meandering shape along the temperature control region, in order to thereby increase the cooling distance along the temperature control region.

According to a further exemplary embodiment, the installation box may be formed of a material, which may be stiffer than the material of the base body, wherein the material of the installation box may in particular have a density of more than 2500 kg/m³. For example, the functional units in the installation box may thus be protected, while the base body may elastically deform around the installation box. In this way, it may be ensured that, upon a load of the platform, the base body may deform elastically without however damaging the sensible functional elements, because the latter may be present in the stiffer and harder installation box.

According to a further exemplary embodiment, the installation opening of the installation box may be formed in the bottom surface of the base body. Thus, a simple access to the installation box may be provided via the bottom surface.

According to a further exemplary embodiment, the roller element may be arranged in the installation box such that at least a part of the circumference of the roller element may protrude through the installation opening out of the installation box.

According to a further exemplary embodiment, the roller element may be beared rotatably in the installation box by an axle element. The axle element may be fixed in the installation box such that the axle element may be deformable (in particular elastically deformable) and/or displaceable in the direction towards the installation opening.

When the axle element is formed elastically deformable, the roller element may, upon a load of the base body, be pushed into the installation volume without, for example, a region of the roller element protruding out of the installation volume. Thus, the base body may deform and may be pushed, for example, against the ground without the roller element being damaged. Due to the elastical deformation of the axle element, the latter may form back into its starting position after the load of the base plate may have been stopped. In this starting position, the roller element may protrude again at least partially out of the installation volume and from the bottom surface, such that the platform may be rolled over the ground again.

According to a further exemplary embodiment, the axle element may be preloaded by a preload spring in the direction towards the installation opening, wherein the installation opening of the installation box may be formed in the bottom surface of the base body. The axle element may be formed, for example, stiff and robust, and may be preloaded by a preload spring such that the roller element, in the unloaded state of the base body, may protrude at least partially out of the installation opening, such that the platform may roll along the ground. Upon a load of the platform in the direction towards the ground, the axle element and thus also the roller element may be pushed in the direction towards the interior of the installation box, until the roller element may be completely present in the installation volume and may thus be protected. After relief of the platform, the preload spring may pull or may push the roller element again in the direction towards the starting position. For an improved guidance, the axle element may be arranged in guiding rails, which may be arranged at the ends of the axle element and which may be fixed to the installation box.

According to a further exemplary embodiment, the installation box may have an installation opening, through which the installation volume may be accessible from the surroundings, wherein the lid may be formed in particular at least partially in the temperature control region, wherein the lid may be detachable such that an access to the installation volume may be providable. The lid may be detachably fixed to a base body of the installation box or to the base body of the platform, for example, by a screwed connection or by additional attachment elements, such as for example screws. The lid may close the installation opening of the installation box and may thus protect the functional equipments within the installation box. The lid may consist of the same material as the base body of the installation box.

Furthermore, the lid may form the temperature control region and may have a different material in comparison to the base body of the installation box. For example, the base body of the installation box may consist of a material, which may have a lower heat conductivity coefficient than a material of the lid. Thus, for example, the base body of the installation box may consist of an organic material, such as for example a plastic material or wood, and the lid may consist of a metallic material, such as for example aluminium or copper.

According to a further exemplary embodiment, the installation box may have a sealing element, in particular a sealing ring, wherein the sealing element may be arranged in the lid such that the installation volume may be sealed from the surroundings. Thus, the installation volume may be protected also from outer influences, such as, for example, rain or dirt particles.

According to a further exemplary embodiment, the installation box, in particular with the temperature control region, may protrude from the attachment surface in a region of the attachment surface and/or the bottom surface, wherein the region may form in particular a dome shape.

The temperature control region, and in particular the dome shape, may have, for example, an edge length or a diameter ranging from 10 cm to 40 cm, in particular 30 cm (centimeter). The area of the temperature control region may accordingly be between about 100 $cm^2$ and 1600 $cm^2$ (square centimeter), in particular 900 $cm^2$.

According to a further exemplary embodiment, the installation box, in particular with the temperature control region, may protrude from the attachment surface in a region of the attachment surface and/or the bottom surface, wherein the region may form in particular a dome shape. The dome shape may thus form a curved cap, which may protrude from a plane, in which the attachment surface and/or the bottom surface may extend. Thus, a sufficient installation space may be established also in the case of a thin implementation of the base body. Due to the dome shape, sensor radiations, such as for example radar radiation, which may be generated by the assistance systems to be tested, may be reflected back such that the reflected radiation may not be measurable and/or only very negligibly measurable by the assistance system. Thus, it may be prevented, that the assistance systems may measure interferences, which may result from the thickening of the installation volume.

The dome shape may be formed, for example, by the above-described lid. In other words, the lid may have a dome shape, wherein the lid may be detachably fixed to the base body and/or the installation box.

According to a further exemplary embodiment, the platform may have a functional element, which may generate heat during operation. The functional element may be installed in the installation volume of the installation box, wherein the functional element may be thermally coupled to the temperature control area, such that a heat transfer may be providable from the functional element to the temperature control area. Thus, for example, the roller elements, sensors, drive units or control units as functional units may be installed in the installation box.

The term "thermally coupled" may define a connection between the temperature control area and the functional element, along which a heat transfer from the functional element to the temperature control region may take place. Thus, no insulating air gap may be conceived between the functional element and the temperature control area. According to a further exemplary embodiment, the functional element may have a contact surface, which may be configured to contact the temperature control area in order to provide the thermal coupling.

According to a further exemplary embodiment, an adapter means, in particular a heat conducting paste, may be provided between the functional element and the temperature control area, such that a heat transfer from the functional element to the temperature control region may be providable. A heat conducting paste may be a paste, which may improve the heat transfer between two objects. The composition of the respective heat conducting pastes may be dependent from the required heat conductivity. For example, heat conducting pastes may include primarily silicon oil and zinc oxide, and may be manufacturable with aluminium, copper, graphite and/or silver components. Furthermore, the heat conducting paste may have a thermoplastic plastic material.

According to a further exemplary embodiment, the platform further may have a sensor element, in particular an acceleration sensor, an optical sensor, a position measurement sensor (e.g. GPS sensor), or a temperature sensor, which sensor element may be arranged in the installation box.

According to a further exemplary embodiment, the platform further may have a control unit for controlling the roller elements, wherein the control unit may be configured for a wireless data exchange with a further external operating unit for generating control signals. The control signals may, for example, have a transmitting and receiving unit, by which measurement data, control data, or other information may be transmitted to an external unit that is spaced at a distance. Furthermore, the control unit may be coupled, for example, to the roller elements and the drive units, in order to thus control the drive of the roller elements and the steering control of the roller elements. The operating unit may represent, for example a remote control, which may be operated by a user. Furthermore, the operating unit may be part of a control computer, which may control the movement, i.e. the direction and the velocity, of the collision body and/or the direction and velocity of the platform, in order to thus simulate desired test situations.

In the following, exemplary embodiments of the carrier structure are described in more detail.

The carrier structure with the at least one elastically deformable carrier element may be coupled to the base body. After a load-induced deformation of the base body, that is after the base body is present without external load, the carrier element and thus the base body may form back in a load-free, as much as possible plane, unarched starting shape.

The carrier structure may form a self-supporting structure, which may reinforce the base body such that the base body may remain undeformed to a large extent due to the load with the test object and the effect of the gravitational force. In other words, the base body may be deformed, wherein the necessary stability may be formed by the carrier structure. The carrier structure may be formed, for example, in the interior of the base body, for example in a mounting process or by integrating the carrier structure during a mold process of the base body. Alternatively, the base body may be arranged at a surface of the base body. The base body may further have according indentations, such as for example notches, in which the carrier structure may be integrated.

The carrier structure may be formed in particular from a material, which may have a density of more than 2500 $kg/m^3$ and, for example, an E-module of more than 60 GPa. The material of the carrier structure may be, for example, a metallic raw material, such as, for example, aluminium, steel or an elastic plastic material.

The carrier structure consists, for example, of carrier elements, which may be connected to each other at their respective ends. The carrier elements may consist, for example, of bracers or rods in order to form the supporting carrier structure.

According to a further exemplary embodiment, the carrier structure may be formed such that the carrier element may be preloaded in the base body so that the base body may be s present elastically deformed in the load-free starting position. Thus, the base body may be, for example, held under tension, so that despite the thin and light construction of the base body, a stiffness may be increased.

According to a further exemplary embodiment, the base body may have at least one coupling element, which may displaceably couple the carrier element to the base body. The coupling element may be formed in particular as a bushing, and the carrier element may be formed as a carrier bar, which may be beared slidably in the bushing. Accordingly, the carrier bar may have an end region having a hollow profile, and the base body may have a corresponding protruding element and/or a pin, which may engage in the hollow end region of the carrier bar. The coupling element may be formed, for example, also as a lug, a flap (or butt strap) or a blind hole into the base body.

The carrier bar may have in particular an extension direction. The carrier bar may be coupled in the coupling element translationally slidably along the extension direction. The carrier bar and the base body may have different heat extension coefficients due to their different materials. For example, the carrier structure (for example, made of metal) may deform less than the base body (for example, made of plastic material) due to temperature influences. Due to the lesser deformation of the carrier structure, a deformation of the base body, which may induced thereby, may be prevented, because the carrier structure, and/or in particular its carrier bars, may move along their extension direction without the base body being accordingly extended and/or deformed or arched directly proportionally. Upon an elongation of the carrier bar, a tolerance (or clearance) in the coupling element may be utilized initially (due to the translational movement possibility between the coupling element and the carrier bar), until a direct force transmission to the base body may take place due to the elongation. Thus, a high form stability of the platform may be achieved also for quickly changing temperatures.

According to a further exemplary embodiment, the carrier structure may be configured such that the elastically deformable carrier element may be coupled to the base body, such that the carrier element may act against a thermally induced deformation of the base body. For example, the carrier element may be formed stiffer than the base plate, such that a thermal deformation, in particular a warping, of the base plate may be prevented due to the bending stiffness of the carrier elements. The carrier elements may consist, for example, of the carrier bars described above and thus generally may have a heat elongation in their extension direction. The carrier bars may be robust against a warping force of the base plate and thus may act against a deformation of the base plate. In an alternative embodiment, for example the heat extension coefficient of the material of the carrier element may be greater than the heat extension coefficient of the material of the base body.

According to a further exemplary embodiment, the at least one installation box may be arranged in a receiving opening of the base body. The coupling element may be arranged at the installation box. For example, the coupling element may be formed integrally with the installation box. In particular, the coupling element may consist of the same material as the installation box. In a preferred embodiment, both the coupling element and the installation box may consist of a metallic raw material, and thus may have a higher rigidity and hardness in comparison to the more ductile plastic material.

In a further exemplary embodiment, the base body may have at least three outer edge regions, wherein the carrier structure may have at least three carrier elements, for example carrier bars. A respective one of the carrier elements may run along the outer edge regions. Respective two of the carrier elements may be connected mutually to each other at their end sections, for example each by a common coupling element and/or by a common installation box. The carrier elements thus may run respectively parallel to the edges of the corresponding outer edge regions of the base body. Thus, a robust and supporting bearing structure for a defined reinforcement (or stiffening) of the base body may be achieved.

According to a further exemplary embodiment, two opposing carrier elements respectively may have further coupling elements. The carrier structure in addition may have at least one connection carrier, which may be, with its ends, fixed displaceably (along its extension direction) respectively in one of the coupling elements. The connection carrier thus may form a cross-brace, by which the carrier structure may become more warp resistant.

It is pointed out that the embodiments described herein represent only a limited selection of possible embodiment variants of the invention. Thus, it is possible to combine the features of individual embodiments in a suitable manner such that a plurality of different embodiments is to be considered as obviously disclosed for the skilled persons with the herein explicit embodiment variants. In particular, some embodiments of the invention are described by device claims and other embodiments of the invention by method claims. However, upon reading this application, the skilled person will immediately understand that, unless it is not explicitly stated differently, in addition to a combination of features, which belong to one type of invention object, also an arbitrary combination of features, which belong to different types of invention objects is possible.

SHORT DESCRIPTION OF THE DRAWINGS

Figure 4:
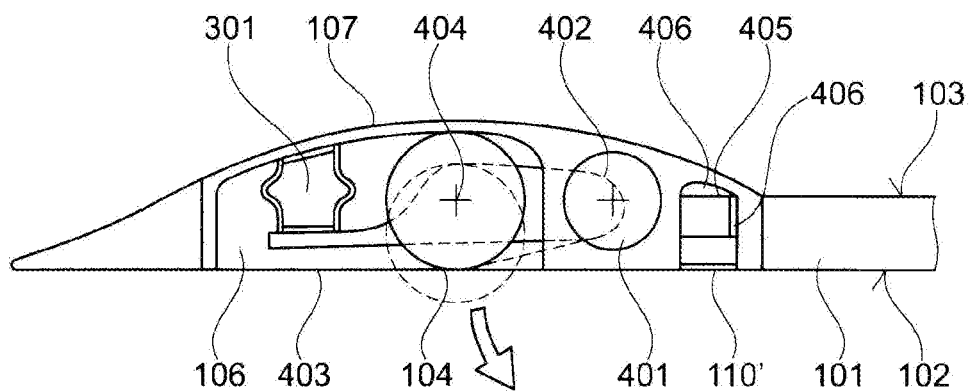
Figure 5:
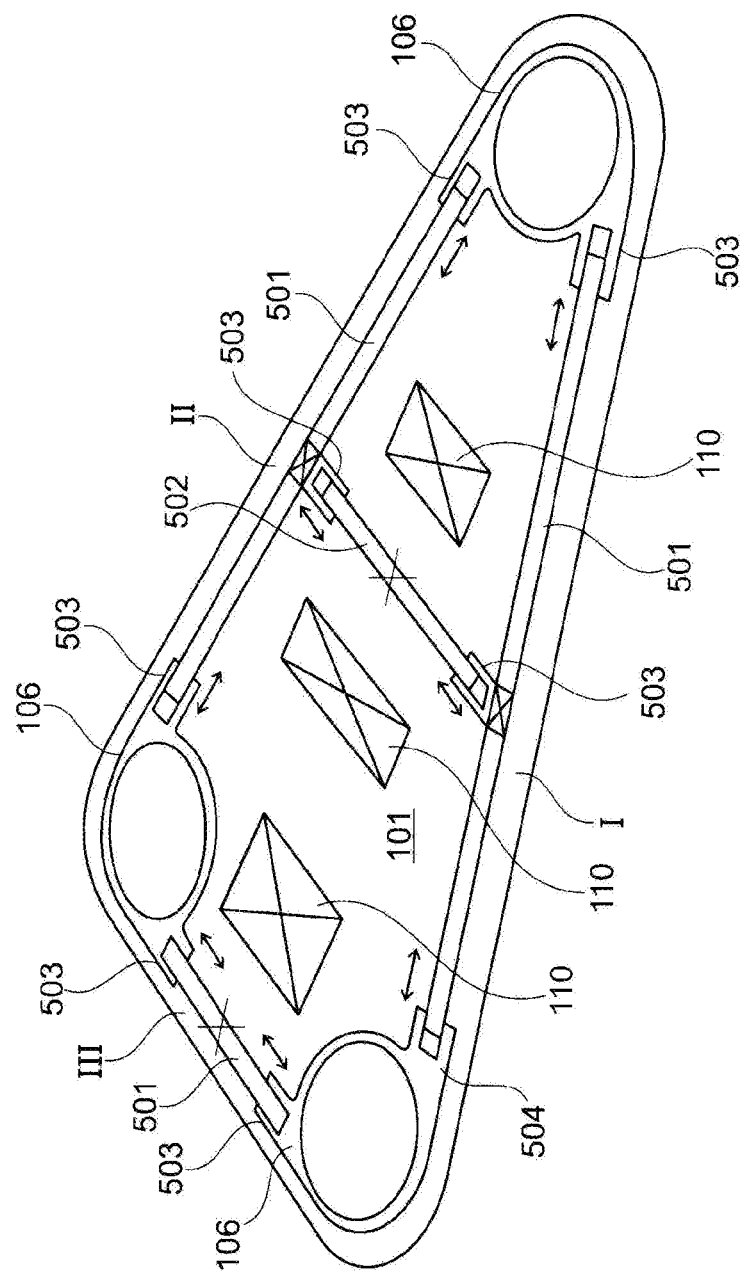

In the following, embodiment examples are described in more detail with reference to the appended drawings for a further explanation and for a better understanding of the present invention. In the drawings:

FIG. 1 shows a schematic illustration of a platform according to an embodiment example of the present invention, wherein the platform lies on the ground in an unloaded state, FIG. 2 shows a schematic illustration of the platform of FIG. 1, wherein the platform is represented in loaded state, FIG. 3 shows a perspective illustration of a platform according to an embodiment example of the present invention, FIG. 4 shows a cross-sectional illustration of an installation box of a platform according to an exemplary embodiment of the present invention, and FIG. 5 shows a schematic illustration of a platform, in which a carrier structure is arranged, according to an exemplary embodiment of the present invention.

DETAILED DESCRIPTION OF EXEMPLARY EMBODIMENTS

Equal or similar components in different figures are provided with same reference numerals. The illustrations in the figures are schematic.

FIG. 1 and FIG. 2 show a platform 100 for testing collisions or near-collision situations between a collision body, in particular a vehicle, and a test object. The platform 100 may have a base body 101, which may have a bottom surface 102 and an attachment surface 103 formed opposite to the bottom surface 102, wherein an attachment device 109 may be formed on the attachment surface 103 for fixing the test object. Furthermore, the platform 100 may have at least one roller element 104, which may be arranged at the bottom surface 102, wherein the roller element 104 may be configured such that the base body 101 may be displaceable along a ground 105 by the roller elements. The base body 101 may be formed of an elastically deformable material having a thickness of less than 2500 kg/m$^3$.

The collision body may be, for example, a passenger car, which may drive against a test object fixed on the platform 100, in order to effectuate an impact with a test object and/or to test driver assistance systems in the passenger car. Herein, the collision body and/or the vehicle may drive with its vehicle tires 200 over the platform 100 such that the latter may deform elastically (see FIG. 2).

The test object may be, for example, a human-like dummy, which may be attachable standing, lying or sitting on the platform.

The platform 100 may be displaceable along a ground 105 by roller elements 104. The platform 100, on which the test object may be arranged, may cross the driving path of the collision body such that the approach of the test object to the collision body may be measured by driver assistance systems and the latter can be tested hereby.

The platform 100 may have the base body 101, which forms a sheet-like (or board-like) shape. This may mean, that an extension in a ground plane may be significantly greater than its thickness in, for example, a vertical direction. Herein, the base body 101 may have a lower bottom surface 102 and an opposing upper attachment surface 103. The base body 101 may be beared with its bottom surface on the ground 105. In the bottom surface 102, roller elements 104 may be arranged rotatably, which may protrude at least partially from the base body 101 and thus may provide a space (or distance) between the base body 101 and the ground 105. An attachment device 109 may be formed on the attachment surface 103. The attachment device may be configured to fix the test object.

The attachment device 109 may, for example, consist of a hook system, in which the test object may be hooked up. Furthermore, the attachment device 109 may have a magnet, in particular a controllable electromagnet, in order to fix the test object to the attachment surface 103 by a magnetic holding force.

The roller elements may be arranged at the bottom surface 102. The platform 100 may be displaceable along the ground 105 by the roller elements 104. Herein, the platform 100 may be formed freely displaceable, in that the roller element may be driven itself as is described in more detail below and, according to an exemplary embodiment, may be configured steerable.

In order to provide a compact and at the same time however robust implementation of the platform 100, the base body 101 may be formed of an elastically deformable material having a density of less than 2500 kg/m$^3$ and/or a carrier structure (see FIG. 5) having at least one elastically deformable carrier element 501 (see FIG. 5) for coupling with the base body 101, such that, after a load-induced deformation of the base body 101, the carrier element 501 may form the base body 101 back in a load-free starting shape.

The base body 101 may be configured such that it is spaced at a distance from the ground 105 (see FIG. 1) in a state, in which the base body may bear on the ground 105 with the roller elements 104 and in which the test object may be attached on the attachment surface 103. This may mean, that only the roller elements 104 may bear on the ground 105.

During a test, the collision body may drive over the base body 101, for example with a tire 200, such that the base body may deform and may bear on the ground 105 with its bottom surface 102, for example punctually or across the entire surface. After the tire 200 may have driven over the base body 101, the latter may deform back again in the original starting position.

Thus, the base body 101 may be formed very flatly and robustly, because the base body 101 may give in due to its elastic properties without breaking, as it would be the case in the case of stiff and rigid bodies.

The base body 101 may have a thickness between the bottom surface 102 and the attachment surface 103 of less than about 6 cm. Herein, the thickness may be the shortest distance between the bottom surface 102 and the attachment surface 103. Besides the region with the lowest thickness, the base body 101 may further have scattered thicker regions, such as, for example, the installation boxes 106 described below. Due to the selection according to the invention of the density of the material of the base body 101, an extremely thin configuration, in particular less than 6 cm thickness, may be possible.

As it is represented in FIG. 1 and FIG. 2, the base body 101 may be manufactured from a solid material. For example, the installation boxes 106 may be formed in the solid material of the base body 101.

The platform 100 may have an installation box 106, which may have an installation volume, which installation box may be arranged in a receiving opening of the base body 101. The installation box 106 may have an installation opening 403 (see FIG. 4), through which the installation volume may be accessible from the outside. The installation box 106 may be formed integrally for example as a recess in the base body 102. One or more functional elements of the platform 100 may be installed in the installation volume of the installation box 106. Thus, for example, the roller elements 104, sensors, drive units or control units may be installed in the installation box.

The installation box 106 may be conceived in the receiving opening of the base body 101 such that a temperature control region 110 of the installation box 106 may be in contact with surroundings 120 of the base body 101. The temperature control region 110 may be formed of a material, which may have a greater heat conductivity coefficient than a material of the base body 101.

The temperature control region 110 of the installation box 106 may be a region of the latter, which may be in contact with surroundings 120 of the base body 101, i.e. for example with the ambient air of the base body 101. Thus, the ambient air of the base body 101 may be employed as a coolant, and the temperature control region 110 may emit heat from (or out of) the interior of the installation box 106 to the surroundings. Thus, in particular the temperature of functional units in the installation volume may be dissipated to the outside via the temperature control region 110 to the surroundings.

In particular, the temperature control region 110 may be formed of a material, which may have a greater heat conductivity coefficient than a material of the base body 101.

A lid forms the temperature control region 110 at least partially, wherein the lid may be detachable such that an access to the installation volume may be providable. The lid may close the installation opening 403 of the installation box 106 and thereby may protect the functional devices within the installation box 106.

The installation box 106 may project from the attachment surface 103 with a region, as is illustrated in FIG. 1 and FIG. 2, wherein the region may form in particular a dome shape 107. Thus, the dome shape 107 may form a bent (or curved) cap (or bonnet), which may protrude from a plane, in which the attachment surface 103 may run. Thereby, a sufficient installation space may be established also for a thin implementation of the base body 101. Due to the dome shape 107, sensor radiations, such as for example radar radiation, which may be generated by the assistance systems to be tested, may be reflected back at an angle, by which the reflected radiations may not measurable. Thus, it may be prevented that the assistance systems measure interferences (or disturbances) which may result due to the thickening of the installation volume.

The dome shape 107 may be formed, for example, by the lid described above. In other words, the lid and thus also the temperature control region 110 may have a dome shape 107, wherein the lid may be detachably attached to the base body 101 and/or the installation box 106.

The installation boxes 106, which may be spaced at a distance, may be coupled to each other e.g. functionally, for example for a data exchange (for example via conducting wires or fibre optic cables).

The roller elements 104 may be arranged in the installation boxes 106 such that at least a part of the circumference of the roller elements 104 may protrude out of the installation box 106 through the installation opening.

The dome shape 107 may be formed, for example, by the lid described above. In other words, the lid and thus also the temperature control region 110 may have a dome shape 107, wherein the lid may be detachably fixed to the base body 101 and/or the installation box 106.

Furthermore, a sensor element 108, in particular an acceleration sensor, an optical sensor or a temperature sensor, which sensor element may be arranged in the installation box, may be provided in the platform 100.

FIG. 3 shows a perspective illustration of an exemplary embodiment, wherein the platform 100 may have three roller elements 104, which may be arranged spaced at a distance at the bottom surface 102. The base body 101 may form a triangular plan view. A triangular plan view may have three corner regions. In each one of the corner regions, for example one roller element 104 may be formed. In this way, a high rolling stability and a good controllability (or steerability) of the platform may be given.

The platform 100 may further have a steering mechanism 301, which may be configured to steer at least one roller element 104 (see the double arrow in FIG. 3). The roller element 104 may be formed rotatably at the base body 101. The steering mechanism 301 may have a steering motor (e.g. servomotor), which may be coupled to the at least one roller element 104, in order to steer the roller element 104. For example, the steering mechanism may have a steering axle, to which the roller element 104 may be fixed rotatably. The servomotor of the steering mechanism 301, which may be arranged at the roller element 104 or centrally in the base body 101, may steer the roller element 104 around the steering axle after receipt of according control commands.

FIG. 4 shows a cross-section illustration of the platform 100 and an installation box 106 according to an exemplary embodiment of the present invention. A drive unit 401 (e.g. an electromotor), which may be configured to drive the at least one roller element 104, may be arranged in the installation box 106. The drive unit 401 may drive one or more roller elements 104 simultaneously.

In the embodiment example of FIG. 4, the drive unit 401 may be arranged spaced at a distance to the at least one roller element 104, wherein the drive unit may be coupled to the roller element 104 for transmitting a driving force, in particular by a drive belt 402. In FIG. 4, the drive unit 401 may be, to the full extent, in (thermal) contact with the material and/or with the temperature control region 110 of the installation box 106.

Furthermore, a steering mechanism 301 may be represented, which may be configured to steer the at least one roller element 104. The roller element 104 may be formed, for example, rotatably at the base body. The steering mechanism 301 may have a steering motor (e.g. a servomotor), which may be coupled to the at least one roller element 104, in order to steer the roller element 104. For example, the steering mechanism 301 may have a steering axle, to which the roller element 104 may be attached rotatably. The servomotor of the steering mechanism 301, which may be arranged at the roller element 104 or centrally in the base body 101, may steer the roller element 104 around the steering axle after receipt of according control commands.

Furthermore, in the embodiment example of FIG. 4, the installation box 106 may form a self-supporting unit, in that it may be arranged in the base body 101 and/or in a receiving opening provided accordingly for this. The installation box 106 may be formed of a material, which may be stiffer than the material of the base body 101, wherein the material of the installation box may have in particular a density of more than 2500 kg/m$^3$. Thus, for example the functional elements may be installed protectedly in the installation box 106, while the base body 101 may deform elastically around the installation box 106. In this way, it may be ensured that, upon a load of the platform 100, the base body may deform elastically, however without impairing the sensible functional elements, because these may be present in the stiffer and harder installation box.

The installation opening 403 of the installation box 106 may be formed in the bottom surface 102 of the base body. Thus, a simple access to the installation box may be provided via the bottom surface 102.

An adapter means, in particular a heat conducting paste 406, may be provided between the functional element, such as for example the control unit 405 illustrated in FIG. 4, and the temperature control region 110 such that a heat transfer from the functional element to the temperature control region 110 may be providable.

The roller element 104 may be beared rotatably in the installation box 106 by an axle element 404. The axle element 404 may be fixed in the installation box 106 such that the axle element 404 may be deformable (in particular elastically deformable) and/or displaceable in the direction towards the installation opening 403.

If the axle element 404 may be formed elastically deformable, the roller element 104 may be pushed into the installation volume upon a load of the base body 101, without, for example, a section of the roller element 104 protruding outwardly from (or out of) the installation volume. Thus, the base body 101 may deform and may, for example, be pushed against the ground, without the roller element 104 being damaged. Due to the elastic deformation of the axle element 404, this may deform back in its starting position after the load of the base plate 101 may have been stopped. In this starting position (illustrated dottedly in FIG. 4), the roller element 104 may protrude again partially out of the installation volume and from the bottom surface 102, such that the platform 100 may be rolled over the ground again.

The axle element 404 may also be preloaded (or strained) by a preload spring in the direction towards the installation opening 403. Upon a load of the platform 100 in the direction towards the ground, the axle element 404 and thus also the roller element 104 may be pushed in the direction towards the interior of the installation box 106, until the roller element 104 may be completely present in the installation volume and may thus be protected. After relief of the platform 100, the preload spring may pull or may push the roller element 104 again in the direction towards the starting position. For a better guidance, the axle element 404 may be arranged in guiding rails, which may be arranged at the ends of the axle element 404, and which may be attached to the installation box 106.

Furthermore, a control unit 405 for controlling the roller elements 104 in the installation box 106 may be installed, wherein the control unit 405 may be configured for a wireless data exchange with a further external operating unit (not shown) for generating control data. The control unit 405 may have, for example, a transmission and receiving unit, by which measurement data, control data or other information may be transmitted to an external unit (not shown) that may be spaced at a distance. Furthermore, the control unit 405 may be coupled to the roller elements 104 and the drive units 401, in order to thus control the drive of the roller elements 104 and the steering mechanism 301 of the roller elements 104.

FIG. 5 shows the platform 100, in which a carrier structure (or support structure) is arranged, according to an exemplary embodiment of the present invention. In order to provide a compact and at the same time however also robust embodiment of the platform 100, the base body 101 may be coupled to a carrier structure consisting of at least one elastically deformable carrier element 501, such that, after a load-induced deformation of the base body 101, the carrier element 501 may deform the base body 101 back in a load-free starting shape. The carrier structure may be coupled to the base body 101 with elastically deformable carrier elements 501. After a load-induced deformation of the base body 101, that is after the base body 101 may be present without external load, the carrier element 501 may form itself and thus the base body 101 back into a load-free starting shape.

The carrier structure may form a self-supporting structure, which may reinforce the base body 101 such that the base body 101 may remain undeformed due to the load by the test object and the effect of the gravitational force. In other words, the base body 101 may be deformed, wherein the necessary stability may be formed by the carrier structure. The carrier structure may be formed in the interior of the base body 101, for example by integrating the carrier structure during a mold process of the base body 101.

The carrier elements 501 may be displaceably coupled to the base body 101. A bushing as the coupling element 503 may receive a carrier bar as a carrier element 501, wherein the carrier element 501 may be beared displaceably in the bushing. The carrier bar may have in particular an extension direction. The carrier bar may be coupled translationally displaceable along the extension direction in the coupling element 503. Despite a larger or smaller deformation of the carrier structure, thus a deformation of the base body induced to this may be prevented, without the base body 101 being accordingly directly, proportionally extended and/or being deformed. Upon an elongation of the carrier bar, initially, a tolerance (or clearance) in the coupling element 503 (due to the translational movement possibility between the coupling element 503 and the carrier bar) may be utilized, until a direct force transmission to the base body 101 may take place due to the elongation.

The coupling element 503 may be arranged at the installation box 106. For example, the coupling element 503 may be formed integrally with the installation box 106. In particular, the coupling element 503 may consist of the same material as the installation box.

The base body 101 of FIG. 5 may have, for example, a triangular shape having at least three outer edge regions, wherein the carrier structure may have at least three carrier elements 501, for example carrier bars. A respective one of the carrier elements 501 may run along the outer edge regions. Respective two of the carrier elements 501 may be coupled at their end sections to a common installation box 106, for example respectively via one coupling element 503. Thus, the carrier elements 501 may run, respectively, parallel to the edges of the corresponding outer edge regions of the base body 101. Thus, a robust and supporting bearing structure for a defined reinforcement (or stiffening) of the base body 101 may be achieved.

Two opposing carrier elements 501, respectively, may have further coupling elements 503. The carrier structure may have at least one connection support 502, which may be fixed displaceably (along its extension direction) with its ends, respectively, in one of the coupling elements 503. The connection carrier 502 thus may form a cross-brace (or stabilizer bar), by which the carrier structure may become more warp resistant.

Supplementarily, it is to be noted that "having" (or "comprising") does not exclude other elements or steps, and "a" or "an" do not exclude a plurality. Furthermore, it is to be noted that features or steps, which have been described with reference to one of the embodiment examples described above can also be used in combination with other features or steps of other embodiment examples described above. Reference numerals in the claims are not to be considered as limitations.

LIST OF REFERENCE NUMERALS 100 platform
101 base body
102 bottom surface
103 attachment surface
104 roller element
105 ground
106 installation box
107 dome shape
108 sensor element
109 attachment device
110 temperature control region
120 surroundings 200 tire
301 steering mechanism
401 drive unit
402 drive belt
403 installation opening
404 axle element
405 control unit
406 heat conducting paste
501 carrier element
502 connection support
503 coupling element

The invention claimed is:

1. A platform for testing collisions or near-collision situations between a collision body and a test object, the platform comprising:
a base body having a bottom surface and an attachment surface formed opposite to the bottom surface, wherein an attachment device is located on the attachment surface for attaching the test object;
at least one roller element located at the bottom surface, wherein the roller element is configured to displace the base body along a ground by the roller element; and
wherein the base body is configured to be driven over by the collision body, wherein the base body is formed of an elastically deformable material having a density of less than 2500 kg/m$^3$, wherein the base body is configured to deform when driven over by the collision body, and wherein the base body is configured to return to a load-free starting shape after a load from the collision body is removed therefrom.

2. The platform according to claim 1, wherein the material has an E-module of less than 60 GPa.

3. The platform according to claim 1, wherein the base body has a thickness between the bottom surface and the attachment surface of less than 6 cm.

4. The platform according to claim 1, wherein the base body has a pressure resistance of at least 0.9 MPa.

5. The platform form according to claim 1, wherein the material of the base body comprises at least one of an organic material a fiber reinforced composite material, or a polymeric material.

6. The platform according to claim 1, wherein the base body includes a composite a sandwich construction.

7. The platform according to claim 1, wherein the base body takes the form of a substantially triangular shape, a substantially quadrangular shape, a substantially round shape, or a substantially oval shape.

8. The platform according to claim 1, further having comprising a drive unit configured to provide a motive force to the at least one roller element, wherein the drive unit is operably coupled to the roller element through at least one of a belt drive, a geared transmission, or a direct drive.

9. The platform according to claim 1, further comprising a steering motor which is configured to steer the at least one roller element.

10. The platform according to claim 1, further having comprising three roller elements located at the bottom surface, wherein the roller elements are configured to move the base body along the ground.

11. The platform according to claim 1, further comprising an installation box having an installation volume, wherein the installation box is located in a receiving opening of the base body, and wherein the installation box has an installation opening through which the installation volume is accessible, the installation box further comprising:
wherein the installation box is formed of a material having a density greater than 3500 kg/m$^3$,
wherein the installation opening is formed in the bottom surface of the base body,
wherein the roller element is arranged in the installation box such that at least a portion of the roller element protrudes outwardly from the installation box through the installation opening, and
wherein the roller element is rotatably coupled within the installation box by an axle element, wherein the axle element is elastically deformable in a direction toward the installation opening, and wherein the axle element is preloaded in the direction toward the installation opening by a preload spring.

12. The platform according to claim 11, wherein the installation box protrudes from the attachment surface at a region, and wherein the region includes a dome shape.

13. The platform according to claim 11, wherein the installation box has a detachable lid.

14. The platform according to claim 11, further having a sensor element located in the installation box, wherein the sensor comprises at least one of an acceleration sensor, an optical sensor, a position measurement sensor, and a temperature sensor.

15. The platform according to claim 1, further having a control unit for controlling the roller element, wherein the control unit is configured for a wireless data exchange with an external operation unit configured for generating control data.

16. The platform according to claim 1, further comprising a carrier structure including at least one elastically deformable carrier element, which is coupled to the base body such that after a load-induced deformation of the base body, the carrier element forms the base body back into the load-free starting shape.

17. A platform for testing collisions or near-collision situations between a collision body and a test object, the platform comprising:
a base body including a bottom surface and an attachment surface located opposite to the bottom surface;
an attachment device is located at the attachment surface for attaching the test object thereto;
at least one roller element located at the bottom surface;
wherein the roller element is configured such that the base body is displaceable along a surface by the roller element;
a carrier structure having at least one elastically deformable carrier element; and
wherein the base body is configured to be ran over by the collision body, wherein the base body is configured to deform in response to the load imparted by the collision body on the base body, and wherein upon removal of the load from the collision body, the carrier element returns the base body to a load-free starting shape.

18. The platform of claim 17,
wherein the carrier element preloads the base body, and wherein the base body further includes at least one coupling element which displaceably couples the carrier element to the base body.

19. The platform of claim 18, wherein the coupling element further comprises a bushing and the carrier element comprises a carrier bar, and wherein the carrier bar is displaceably maintained by the bushing.

20. The platform of claim 18, wherein the carrier element is configured to prevent thermally induced deformation of the base body, wherein the base body further includes an installation box defining an installation volume, and wherein the coupling element is located at the installation box.

* * * * *